United States Patent
Mutlu et al.

(10) Patent No.: US 11,774,342 B2
(45) Date of Patent: *Oct. 3, 2023

(54) PARTICULATE MATTER SENSORS BASED ON SPLIT BEAM SELF-MIXING INTERFEROMETRY SENSORS

(71) Applicant: Apple Inc., Cupertino, CA (US)

(72) Inventors: Mehmet Mutlu, Stanford, CA (US); Miaolei Yan, Santa Clara, CA (US); Michael K. Brown, Sunnyvale, CA (US); Richard Yeh, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/833,199

(22) Filed: Mar. 27, 2020

(65) Prior Publication Data

US 2020/0319082 A1 Oct. 8, 2020

Related U.S. Application Data

(60) Provisional application No. 62/830,085, filed on Apr. 5, 2019.

(51) Int. Cl.
*G01N 15/14* (2006.01)
*G01N 15/06* (2006.01)
(Continued)

(52) U.S. Cl.
CPC ......... *G01N 15/1434* (2013.01); *G01N 15/06* (2013.01); *G01P 5/001* (2013.01);
(Continued)

(58) Field of Classification Search
None
See application file for complete search history.

(56) References Cited

U.S. PATENT DOCUMENTS 4,657,382 A    4/1987  Busujima et al.
5,748,295 A *  5/1998  Farmer .................. G01S 17/34
                                                  356/5.09
(Continued)

FOREIGN PATENT DOCUMENTS

CN    2163384    4/1994
CN    1279394    1/2001
(Continued)

OTHER PUBLICATIONS

International Search Report and Written Opinion dated Jun. 19, 2020, PCT/US2020/025814, 15 pages.
(Continued)

*Primary Examiner* — Rufus L Phillips
(74) *Attorney, Agent, or Firm* — Brownstein Hyatt Farber Schreck, LLP

(57) ABSTRACT

Various sensors, including particulate matter sensors, are described. One particulate matter sensor includes a self-mixing interferometry sensor and a set of one or more optical elements. The set of one or more optical elements is positioned to receive an optical emission of the self-mixing interferometry sensor, split the optical emission into multiple beams, and direct each beam of the multiple beams in a different direction. The self-mixing interferometry sensor is configured to generate particle speed information for particles passing through respective measurement regions of the multiple beams.

17 Claims, 13 Drawing Sheets

(51) Int. Cl.
  *G01S 7/4912* (2020.01)
  *G01P 5/26* (2006.01)
  *G01P 5/00* (2006.01)
  *G01P 5/20* (2006.01)

(52) U.S. Cl.
  CPC ............... *G01P 5/20* (2013.01); *G01P 5/26* (2013.01); *G01S 7/4916* (2013.01); *G01N 2015/0693* (2013.01); *G01N 2015/1454* (2013.01)

(56) References Cited

U.S. PATENT DOCUMENTS

| | | | |
|---|---|---|---|
| 5,825,465 | A | 10/1998 | Nerin et al. |
| 6,233,045 | B1 | 5/2001 | Suni et al. |
| 6,794,671 | B2 | 9/2004 | Nicoli et al. |
| 7,227,180 | B2 | 10/2007 | Townley-Smith et al. |
| 7,388,672 | B2 | 6/2008 | Zhou et al. |
| 7,619,744 | B2 | 11/2009 | Liess |
| 7,990,521 | B2 | 8/2011 | Ueno |
| 7,995,193 | B2 | 8/2011 | Kuwata |
| 8,416,424 | B2 | 4/2013 | Werner et al. |
| 8,982,336 | B2 | 3/2015 | Ueno |
| 9,229,024 | B2 | 1/2016 | Carpaij et al. |
| 9,354,315 | B2 | 5/2016 | Lepaysan et al. |
| 9,397,476 | B2 | 7/2016 | Baier et al. |
| 9,726,474 | B2 | 8/2017 | Royo Royo et al. |
| 9,759,736 | B2 | 9/2017 | Zamama et al. |
| 10,180,397 | B2 | 1/2019 | Rakic et al. |
| 10,379,028 | B2 | 8/2019 | Spruit et al. |
| 10,390,730 | B1 | 8/2019 | Shoeb |
| 10,503,048 | B2 | 12/2019 | Del Bino et al. |
| 11,054,244 | B2 | 7/2021 | Oueweltjes et al. |
| 11,119,021 | B2 | 9/2021 | Spruit et al. |
| 11,187,643 | B2 | 11/2021 | Jutte et al. |
| 11,243,068 | B1 | 2/2022 | Mutlu et al. |
| 11,409,365 | B2 | 8/2022 | Mutlu et al. |
| 11,419,546 | B2 | 8/2022 | Cihan et al. |
| 11,450,293 | B2 | 10/2022 | Chen et al. |
| 2010/0081940 | A1* | 4/2010 | McKenna ............ A61B 5/681 600/479 |
| 2011/0285984 | A1* | 11/2011 | Christian ............ G01S 7/4812 356/28.5 |
| 2011/0304850 | A1* | 12/2011 | Sakamoto ............ G01N 21/53 356/337 |
| 2012/0002189 | A1 | 1/2012 | Bengoechea Apezteguia et al. |
| 2012/0055239 | A1* | 3/2012 | Sinha ............ G01F 1/74 73/61.79 |
| 2015/0233820 | A1* | 8/2015 | Roke ............ G01N 15/1434 356/338 |
| 2018/0224368 | A1* | 8/2018 | Spruit ............ G01N 15/0205 |
| 2019/0285537 | A1 | 9/2019 | Spruit et al. |
| 2019/0285753 | A1 | 9/2019 | Spruit et al. |
| 2020/0072723 | A1 | 3/2020 | Weiss et al. |
| 2020/0096310 | A1* | 3/2020 | Mutlu ............ G01N 15/1459 |
| 2020/0318945 | A1 | 10/2020 | Mutlu et al. |
| 2020/0337631 | A1 | 10/2020 | Sahin |
| 2020/0350744 | A1 | 11/2020 | Gerlach |
| 2020/0370879 | A1 | 11/2020 | Mutlu et al. |
| 2021/0010797 | A1 | 1/2021 | Cihan et al. |
| 2021/0080248 | A1 | 3/2021 | Cihan et al. |
| 2021/0302745 | A1 | 9/2021 | Mutlu et al. |
| 2021/0364273 | A1 | 11/2021 | Mutlu et al. |
| 2022/0099431 | A1 | 3/2022 | Chen et al. |

FOREIGN PATENT DOCUMENTS

| | | | |
|---|---|---|---|
| CN | 1682105 | | 10/2005 |
| CN | 102564909 | | 7/2012 |
| CN | 103733061 | | 4/2014 |
| CN | 106226783 | | 12/2016 |
| CN | 207231962 | | 4/2018 |
| CN | 109154659 | | 1/2019 |
| CN | 108692663 | | 4/2020 |
| DE | 102016210830 | | 12/2017 |
| EP | 3514898 | | 7/2019 |
| JP | H06331745 | | 12/1994 |
| WO | WO 10/058322 | | 5/2010 |
| WO | WO-2014086375 A1 * | 6/2014 | ........... G01F 1/7086 |
| WO | WO 17/198699 | | 11/2017 |
| WO | WO 18/104153 | | 6/2018 |
| WO | WO 18/104154 | | 6/2018 |
| WO | WO 18/206474 | | 11/2018 |
| WO | WO 20/207908 | | 10/2020 |
| WO | WO 21/257737 | | 12/2021 |

OTHER PUBLICATIONS

Author Unknown, "Biometric Technology Market Foresees Growth Due to Innovative Advancement," https://menafn.com/mf_contact.aspx?src=Contact_Authors, Dec. 18, 2020, 2 pages.

* cited by examiner

PARTICULATE MATTER SENSORS BASED ON SPLIT BEAM SELF-MIXING INTERFEROMETRY SENSORS

CROSS-REFERENCE TO RELATED APPLICATION

This application is a nonprovisional of and claims the benefit under 35 U.S.C. § 119(e) of U.S. Provisional Patent Application No. 62/830,085, filed Apr. 5, 2019, the contents of which are incorporated herein by reference as if fully disclosed herein.

FIELD

The described embodiments relate generally to particulate matter sensors. More particularly, the described embodiments relate to particulate matter sensors based on split beam self-mixing interferometry sensors.

BACKGROUND

Self-mixing interferometry is an optical sensing technology that can be used for particulate matter detection and air quality monitoring. In self-mixing interferometry, coherent or partially coherent electromagnetic radiation emitted by a stimulated emission-based electromagnetic radiation source (e.g., a laser) may be re-coupled into the electromagnetic radiation source's resonant optical cavity through reflection/backscattering from particulate matter (e.g., small solid or liquid particles, such as particles contained in pollution (smog), ash, dust, pollen, water vapor, and so on). Such re-coupling induces a measurable phase-sensitive change (e.g., a Doppler frequency shift) in the electric field and carrier distribution of the optical resonant cavity.

SUMMARY

Embodiments of the systems, devices, methods, and apparatus described in the present disclosure are directed to particulate matter sensors, and more particularly, to particulate matter sensors based on split beam self-mixing interferometry sensors. A self-mixing interferometry sensor is defined herein as a sensor configured to generate electromagnetic radiation within an optical resonant cavity, emit the electromagnetic radiation from the optical resonant cavity, receive a reflection or backscatter of the electromagnetic radiation back into the optical resonant cavity, self-mix the generated and reflected/backscattered electromagnetic radiation within the optical resonant cavity, and generate an output indicative of the self-mixing. The generated, emitted, and received electromagnetic radiation may be coherent or partially coherent. In some examples, the electromagnetic radiation emitted by a self-mixing interferometry sensor may be generated by an electromagnetic radiation source such as a vertical-cavity surface-emitting laser (VCSEL), a vertical external-cavity surface-emitting laser (VECSEL), a quantum-dot laser (QDL), a quantum cascade laser (QCL), or a light-emitting diode (LED) (e.g., an organic LED (OLED), a resonant-cavity LED (RC-LED), a micro LED (mLED), a superluminescent LED (SLED), or an edge-emitting LED), and so on. The generated, emitted, and received electromagnetic radiation may include, for example, visible or invisible light (e.g., green light, infrared (IR) light, ultraviolet (UV) light, and so on). The output of a self-mixing interferometry sensor may include a photocurrent produced by a photodetector (e.g., a photodiode) that is integrated with, or positioned under, above, or next to, the sensor's electromagnetic radiation source. Alternatively or additionally, the output of a self-mixing interferometry sensor may include a measurement of a bias current or junction voltage of the self-mixing interferometry sensor.

As described herein, a single self-mixing interferometry sensor may be used to determine one or more of: the existence of particulate matter within a set of measurement regions, a speed of particles passing through the measurement regions, an air flow through the measurement regions, a particulate matter concentration within the measurement regions, an air quality within the measurement regions, and so on.

In a first aspect, the present disclosure describes a particulate matter sensor. The particulate matter sensor may include a self-mixing interferometry sensor and a set of one or more optical elements. The set of one or more optical elements may be positioned to receive an optical emission of the self-mixing interferometry sensor, split the optical emission into multiple beams, and direct each beam of the multiple beams in a different direction. The self-mixing interferometry sensor may be configured to generate particle speed information for particles passing through respective measurement regions of the multiple beams.

In another aspect, the present disclosure describes a sensor including an electromagnetic radiation source and a splitter. The electromagnetic radiation source may have a resonant optical cavity. The splitter may be configured to split an optical emission of the electromagnetic radiation source into a set of multiple beams, and to receive reflections or backscatters of the multiple beams and direct the received reflections or backscatters into the resonant optical cavity.

In still another aspect of the disclosure, a method of sensing particulate matter is described. The method may include splitting an optical emission received from a self-mixing interferometry sensor into multiple beams; directing each beam of the multiple beams in a different direction; and outputting, from the self-mixing interferometry sensor, particle speed information for particles passing through respective measurement regions of the multiple beams.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
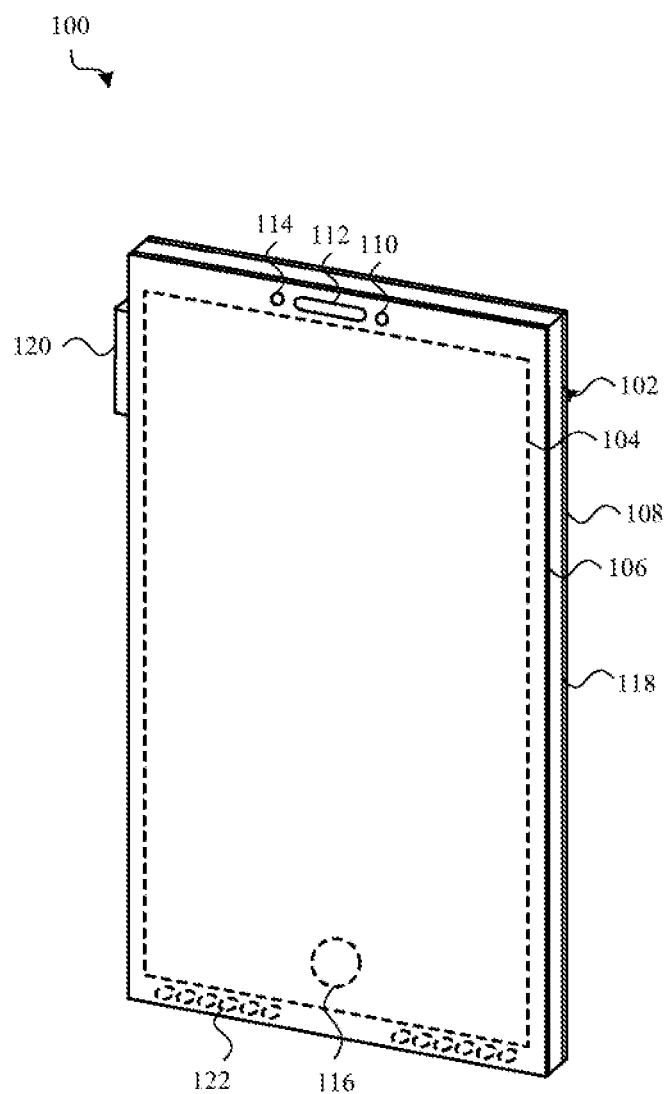
FIGS. 1A and 1B show a first example of a device that may include a particulate matter sensor.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The following description relates to particulate matter sensing. When estimating particulate matter concentration using self-mixing interferometry, accurate particulate matter concentration estimation depends on an accurate three-dimensional (3D) reconstruction of particle speed (e.g., reconstruction of a particle speed vector). However, an intrinsic limit to self-mixing interferometry is that, when a particle passes through a beam of electromagnetic radiation close to the beam's focus, only the absolute particle speed of a particle in the direction of the beam can be measured, while the speed of the particle perpendicular to the beam is lost. Thus, the conventional approach to estimating particulate matter concentration using self-mixing interferometry is to use three self-mixing interferometry sensors oriented in three different directions. However, the use of multiple self-mixing interferometry sensors drives up the cost, complexity, and power consumption of a particulate matter sensor, as well as the size of the particulate matter sensor.

As described herein, a single self-mixing interferometry sensor may be used to determine one or more of: the existence of particulate matter within a set of measurement regions, a speed of particles passing through the measurement regions, an air flow through the measurement regions, a particulate matter concentration within the measurement regions, an air quality within the measurement regions, and so on. A single self-mixing interferometry sensor may be used to sense particulate matter by splitting an optical emission of the self-mixing interferometry sensor into multiple beams having different directions. The optical emission may be split into multiple beams using a set of one or more optical elements, which optical element(s) may include one or more diffractive optical elements (or holographic elements, or periodic sub-wavelength elements, or aperiodic sub-wavelength elements) and one or more beam-shaping optical elements (e.g., one or more focusing, tilting, and/or collimating optical elements). Particle speed information obtained from a self-mixing interference signal (also referred to, at times, as a self-mixing interferometry signal) generated by the self-mixing interferometry sensor, in combination with information regarding the beam geometry, may then be used to estimate particle speed, particulate matter concentration, and other parameters. In some cases, the detected particulate matter may include particulate matter on the order of PM10 (particulate matter less than 10 micrometers ($\mu$m) in diameter) or PM2.5 (particulate matter less than 2.5 $\mu$m in diameter).

These and other embodiments and advantages are discussed with reference to FIGS. 1A-11. However, those skilled in the art will readily appreciate that the detailed description given herein with respect to these figures is for explanatory purposes only and should not be construed as limiting.

Directional terminology, such as "top", "bottom", "upper", "lower", "front", "back", "over", "under", "above", "below", "left", "right", etc. is used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways. The use of alternative terminology, such as "or", is intended to indicate different combinations of the alternative elements. For example, A or B is intended to include A, or B, or A and B.

Figure 1B:
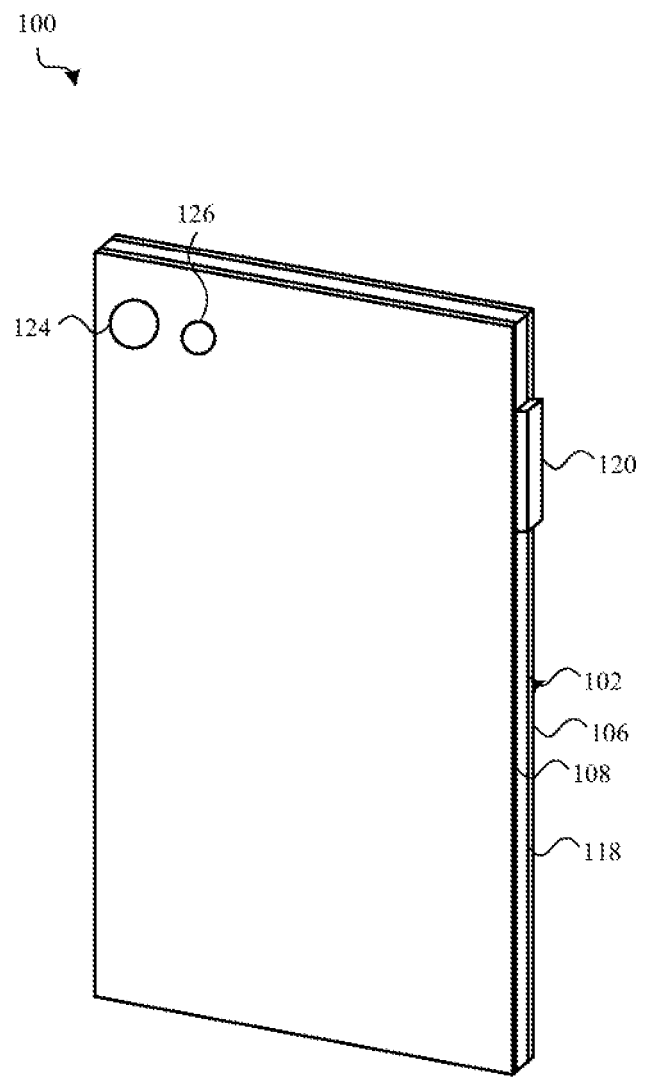

FIGS. 1A and 1B show a first example of a device 100 that may include a particulate matter sensor. The device's dimensions and form factor, including the ratio of the length of its long sides to the length of its short sides, suggest that the device 100 is a mobile phone (e.g., a smartphone). However, the device's dimensions and form factor are arbitrarily chosen, and the device 100 could alternatively be any portable electronic device including, for example, a mobile phone, tablet computer, portable computer, portable music player, health monitor device, portable terminal, vehicle navigation system, robot navigation system, or other portable or mobile device. The device 100 could also be a device that is semi-permanently located (or installed) at a single location. FIG. 1A shows a front isometric view of the device 100, and FIG. 1B shows a rear isometric view of the device 100. The device 100 may include a housing 102 that at least partially surrounds a display 104. The housing 102 may include or support a front cover 106 or a rear cover 108. The front cover 106 may be positioned over the display 104, and may provide a window through which the display 104 may be viewed. In some embodiments, the display 104 may be attached to (or abut) the housing 102 and/or the front cover 106. In alternative embodiments of the device 100, the display 104 may not be included and/or the housing 102 may have an alternative configuration.

The display 104 may include one or more light-emitting elements including, for example, an LED, OLED, liquid crystal display (LCD), electroluminescent (EL) display, or other type of display element. In some embodiments, the display 104 may include, or be associated with, one or more touch and/or force sensors that are configured to detect a touch and/or a force applied to a surface of the front cover 106.

The various components of the housing 102 may be formed from the same or different materials. For example, the sidewall 118 may be formed using one or more metals (e.g., stainless steel), polymers (e.g., plastics), ceramics, or composites (e.g., carbon fiber). In some cases, the sidewall 118 may be a multi-segment sidewall including a set of antennas. The antennas may form structural components of the sidewall 118. The antennas may be structurally coupled (to one another or to other components) and electrically isolated (from each other or from other components) by one or more non-conductive segments of the sidewall 118. The front cover 106 may be formed, for example, using one or more of glass, a crystal (e.g., sapphire), or a transparent polymer (e.g., plastic) that enables a user to view the display 104 through the front cover 106. In some cases, a portion of the front cover 106 (e.g., a perimeter portion of the front cover 106) may be coated with an opaque ink to obscure components included within the housing 102. The rear cover 108 may be formed using the same material(s) that are used to form the sidewall 118 or the front cover 106. In some cases, the rear cover 108 may be part of a monolithic element that also forms the sidewall 118 (or in cases where the sidewall 118 is a multi-segment sidewall, those portions of the sidewall 118 that are non-conductive). In still other embodiments, all of the exterior components of the housing 102 may be formed from a transparent material, and components within the device 100 may or may not be obscured by an opaque ink or opaque structure within the housing 102.

The front cover 106 may be mounted to the sidewall 118 to cover an opening defined by the sidewall 118 (i.e., an opening into an interior volume in which various electronic components of the device 100, including the display 104, may be positioned). The front cover 106 may be mounted to the sidewall 118 using fasteners, adhesives, seals, gaskets, or other components.

A display stack or device stack (hereafter referred to as a "stack") including the display 104 may be attached (or abutted) to an interior surface of the front cover 106 and extend into the interior volume of the device 100. In some cases, the stack may include a touch sensor (e.g., a grid of capacitive, resistive, strain-based, ultrasonic, or other type of touch sensing elements), or other layers of optical, mechanical, electrical, or other types of components. In some cases, the touch sensor (or part of a touch sensor system) may be configured to detect a touch applied to an outer surface of the front cover 106 (e.g., to a display surface of the device 100).

In some cases, a force sensor (or part of a force sensor system) may be positioned within the interior volume below and/or to the side of the display 104 (and in some cases within the device stack). The force sensor (or force sensor system) may be triggered in response to the touch sensor detecting one or more touches on the front cover 106 (or a location or locations of one or more touches on the front cover 106), and may determine an amount of force associated with each touch, or an amount of force associated with the collection of touches as a whole.

As shown primarily in FIG. 1A, the device 100 may include various other components. For example, the front of the device 100 may include one or more front-facing cameras 110, speakers 112, microphones, or other components 114 (e.g., audio, imaging, and/or sensing components that are configured to transmit or receive signals to/from the device 100. In some cases, a front-facing camera 110, alone or in combination with other sensors, may be configured to operate as a bio-authentication or facial recognition sensor. The device 100 may also include various input devices, including a mechanical or virtual button 116, which may be accessible from the front surface (or display surface) of the device 100. In some cases, the front-facing camera 110, virtual button 116, and/or other sensors of the device 100 may be integrated with a display stack of the display 104 and moved under the display 104.

The device 100 may also include buttons or other input devices positioned along the sidewall 118 and/or on a rear surface of the device 100. For example, a volume button or multipurpose button 120 may be positioned along the sidewall 118, and in some cases may extend through an aperture in the sidewall 118. The sidewall 118 may include one or more ports 122 that allow air, but not liquids, to flow into and out of the device 100. In some embodiments, one or more sensors may be positioned in or near the port(s) 122. For example, an ambient pressure sensor, ambient temperature sensor, internal/external differential pressure sensor, gas sensor, particulate matter sensor, or air quality sensor may be positioned in or near a port 122.

In some embodiments, the rear surface of the device 100 may include a rear-facing camera 124 or other optical sensor (see FIG. 1B). A flash or light source 126 may also be positioned along the rear of the device 100 (e.g., near the rear-facing camera). In some cases, the rear surface of the device 100 may include multiple rear-facing cameras.

The camera(s), microphone(s), pressure sensor(s), temperature sensor(s), biometric sensor(s), button(s), proximity sensor(s), touch sensor(s), force sensor(s), particulate matter or air quality sensor(s), and so on of the device 100 may form parts of various sensor systems.

Figure 2A:
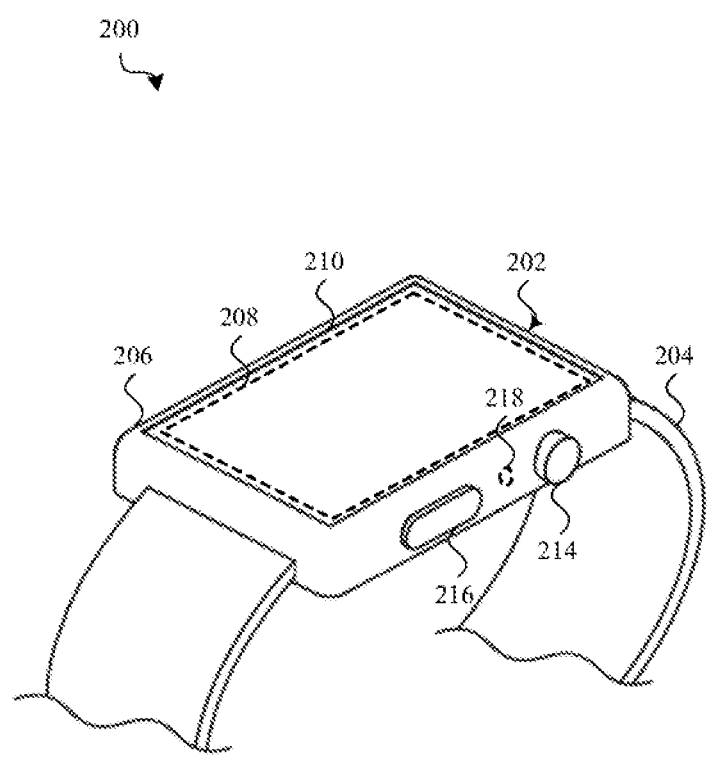
FIGS. 2A and 2B show a second example of a device that may include a particulate matter sensor.
Figure 2B:
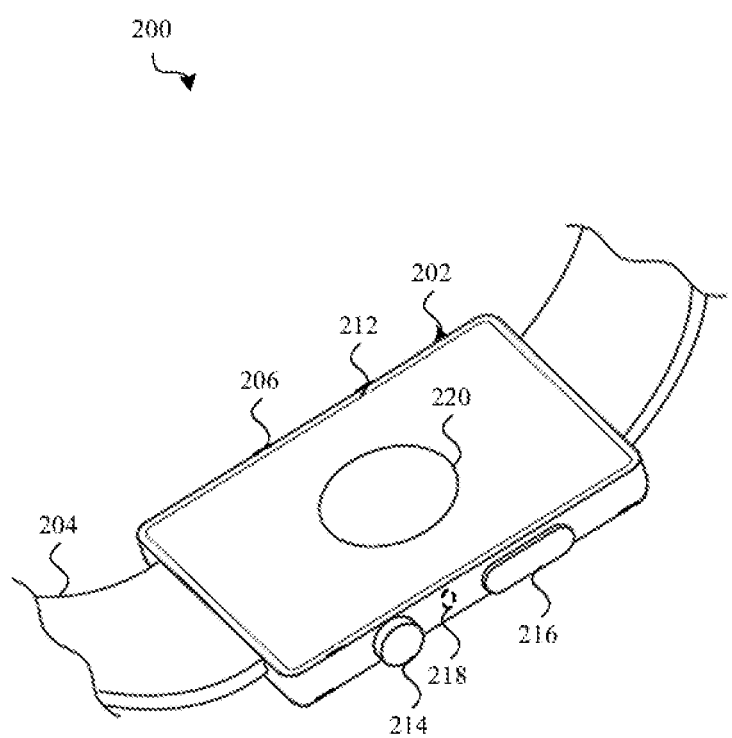

FIGS. 2A and 2B show a second example of a device 200 that may include a particulate matter sensor. The device's dimensions and form factor, and inclusion of a band 204, suggest that the device 200 is an electronic watch. However, the device 200 could alternatively be any wearable electronic device. FIG. 2A shows a front isometric view of the device 200, and FIG. 2B shows a rear isometric view of the device 200. The device 200 may include a body 202 (e.g., a watch body) and a band 204. The watch body 202 may include an input or selection device, such as a crown 214 or a button 216. The band 204 may be used to attach the body 202 to a body part (e.g., an arm, wrist, leg, ankle, or waist) of a user. The body 202 may include a housing 206 that at least partially surrounds a display 208. The housing 206 may include or support a front cover 210 (FIG. 2A) or a rear cover 212 (FIG. 2B). The front cover 210 may be positioned over the display 208, and may provide a window through which the display 208 may be viewed. In some embodiments, the display 208 may be attached to (or abut) the housing 206 and/or the front cover 210. In alternative embodiments of the device 200, the display 208 may not be included and/or the housing 206 may have an alternative configuration.

The housing 206 may in some cases be similar to the housing 102 described with reference to FIGS. 1A-1B, and the display 208 may in some cases be similar to the display 104 described with reference to FIGS. 1A-1B.

The device 200 may include various sensor systems, and in some embodiments may include some or all of the sensor systems included in the device 100 described with reference to FIGS. 1A-1B. In some embodiments, the device 200 may have a port 218 (or set of ports) on a side of the housing 206 (or elsewhere), and an ambient pressure sensor, ambient temperature sensor, internal/external differential pressure sensor, gas sensor, particulate matter sensor, or air quality sensor may be positioned in or near the port(s) 218.

In some cases, the rear surface (or skin-facing surface) of the device 200 may include a flat or raised area 220 that includes one or more skin-facing sensors. For example, the area 220 may include a heart-rate monitor, a respiration-rate monitor, or a blood pressure monitor. The area 220 may also include an off-wrist detector or other sensor.

Figure 3:
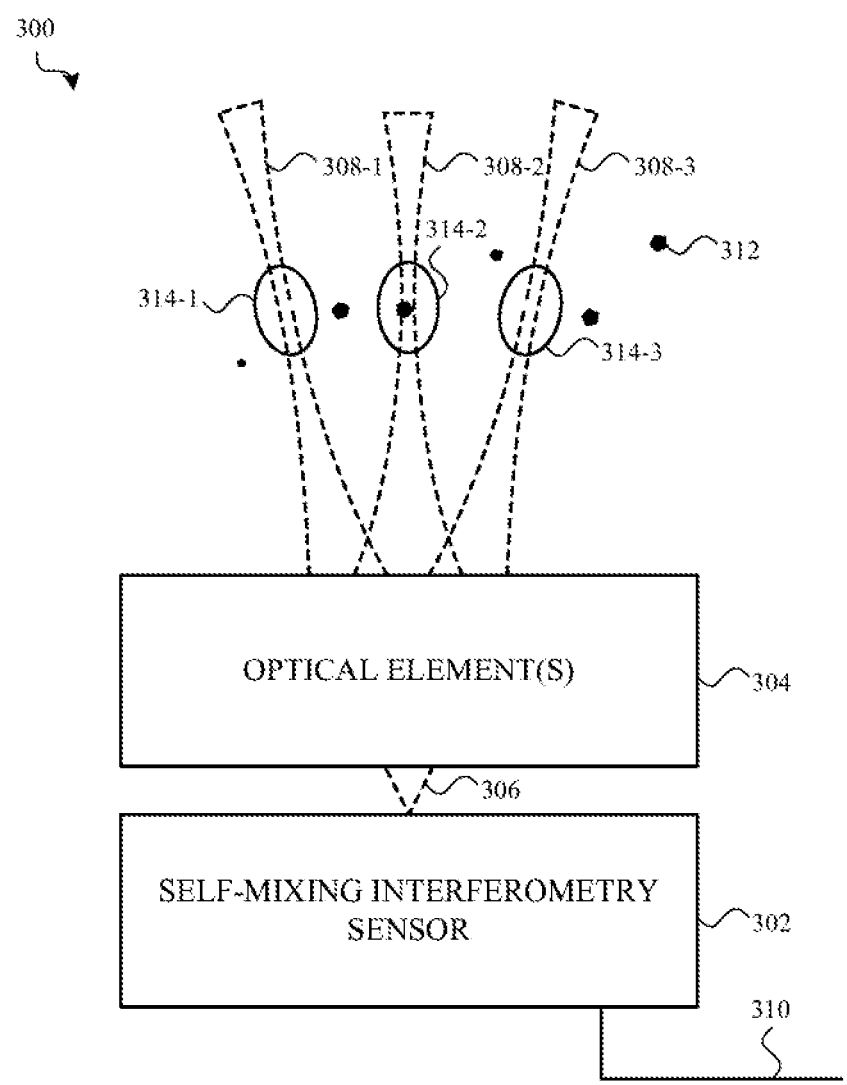
FIG. 3 shows an example block diagram of a particulate matter sensor.

FIG. 3 shows an example block diagram of a particulate matter sensor 300. The particulate matter sensor 300 may include a self-mixing interferometry sensor 302 and a set of one or more optical elements 304 (hereafter referred to as a set of optical elements 304). The set of optical elements 304 may be positioned to receive an optical emission 306 of the self-mixing interferometry sensor 302. The set of optical elements 304 may split the optical emission 306 into a set of multiple beams 308-1, 308-2, 308-3 and direct each beam of the multiple beams 308-1, 308-2, 308-3 in a different direction. The self-mixing interferometry sensor 302 may be configured to generate particle speed information 310 for particles 312 passing through respective measurement regions 314-1, 314-2, 314-3 of the multiple beams 308-1, 308-2, 308-3.

The self-mixing interferometry sensor 302 may include an electromagnetic radiation source that emits the optical emission 306. The optical emission 306 may include a beam of coherent or partially coherent electromagnetic radiation. In some embodiments, the electromagnetic radiation source may include a VCSEL, a VECSEL, a QDL, a QCL, or an LED (e.g., an OLED, an RC-LED, an mLED, a SLED, or an edge-emitting LED).

In some embodiments, the self-mixing interferometry sensor 302 may include an electromagnetic radiation source integrated with a photodetector. In some embodiments, the self-mixing interferometry sensor 302 may include an electromagnetic radiation source that is stacked on, below, or near (e.g., adjacent), a photodetector. In embodiments in which a photodetector is positioned near an electromagnetic radiation source, the set of optical elements 304 may redirect received reflections or backscatters of the multiple beams 308-1, 308-2, 308-3 toward the photodetector. An output current of the photodetector (e.g., a photocurrent, $I_{PD}$) may provide the particle speed information 310. Alternatively, the particle speed information 310 may be obtained by monitoring a junction voltage of the electromagnetic radiation source when the electromagnetic radiation source is driven by a constant current, or by monitoring a current of the electromagnetic radiation source when the electromagnetic radiation source is driven by a constant voltage.

The output current of the photodetector, or junction voltage of the electromagnetic radiation source, or current of the electromagnetic radiation source may vary in response to coherent self-mixing of 1) electromagnetic radiation generated by the electromagnetic radiation source and 2) reflected or backscattered electromagnetic radiation that is received into a resonant optical cavity of the electromagnetic radiation source and coherently mixed with the electromagnetic radiation generated by the electromagnetic radiation source.

The set of optical elements 304 may include, for example, one or more diffractive optical elements (and in some cases a holographic element, a periodic sub-wavelength element, and/or an aperiodic sub-wavelength element) and one or more beam-shaping optical elements (e.g., one or more focusing, tilting, and/or collimating optical elements). The set of optical elements 304 may split the optical emission of the self-mixing interferometry sensor 302 into two, three, four, or more beams. Splitting the optical emission into more beams may improve the accuracy of the particle speed information 310 generated by the self-mixing interferometry sensor 302 (e.g., when the beams are non-orthogonal to each other), but at the expense of reducing the optical power per beam 308-1, 308-2, 308-3 and decreasing the sensitivity of the particulate matter sensor 300 (e.g., as a result of increasing the minimum particle size that can be detected by the particulate matter sensor 300). Conversely, splitting the optical emission 306 into fewer beams may increase the sensitivity of the particulate matter sensor 300 (e.g., as a result of decreasing the minimum particle size that can be detected by the particulate matter sensor 300), but at the expense of decreasing the accuracy of the particle speed information 310 generated by the self-mixing interferometry sensor 302. As described herein, computations to estimate particle speed, air flow volume, and particulate matter concentration may be simplified by splitting the optical emission 306 of the self-mixing interferometry sensor 302 into three beams, and in particular, three beams that form an orthogonal basis.

In some cases, the set of optical elements 304 may focus each beam of the multiple beams 308-1, 308-2, 308-3 at one of the respective measurement regions 314-1, 314-2, 314-3. In some cases, the set of optical elements 304 may include one or more of free-form optics, a micro-lens, a micro-lens per beam, a tilted total internal reflection (TIR) lens per beam, and so on.

In addition to splitting an optical emission of the self-mixing interferometry sensor 302 into multiple beams, the set of optical elements 304 may receive reflections or backscatters of the multiple beams 308-1, 308-2, 308-3 and direct the received reflections or backscatters into a resonant optical cavity of the self-mixing interferometry sensor's electromagnetic radiation source. The set of optical elements 304 may therefore function as a transmitter and splitter when optical transmissions pass through the splitter in a first general direction, and operate as a receiver when optical transmissions pass through the splitter in a second general direction, opposite the first general direction).

Figure 4:
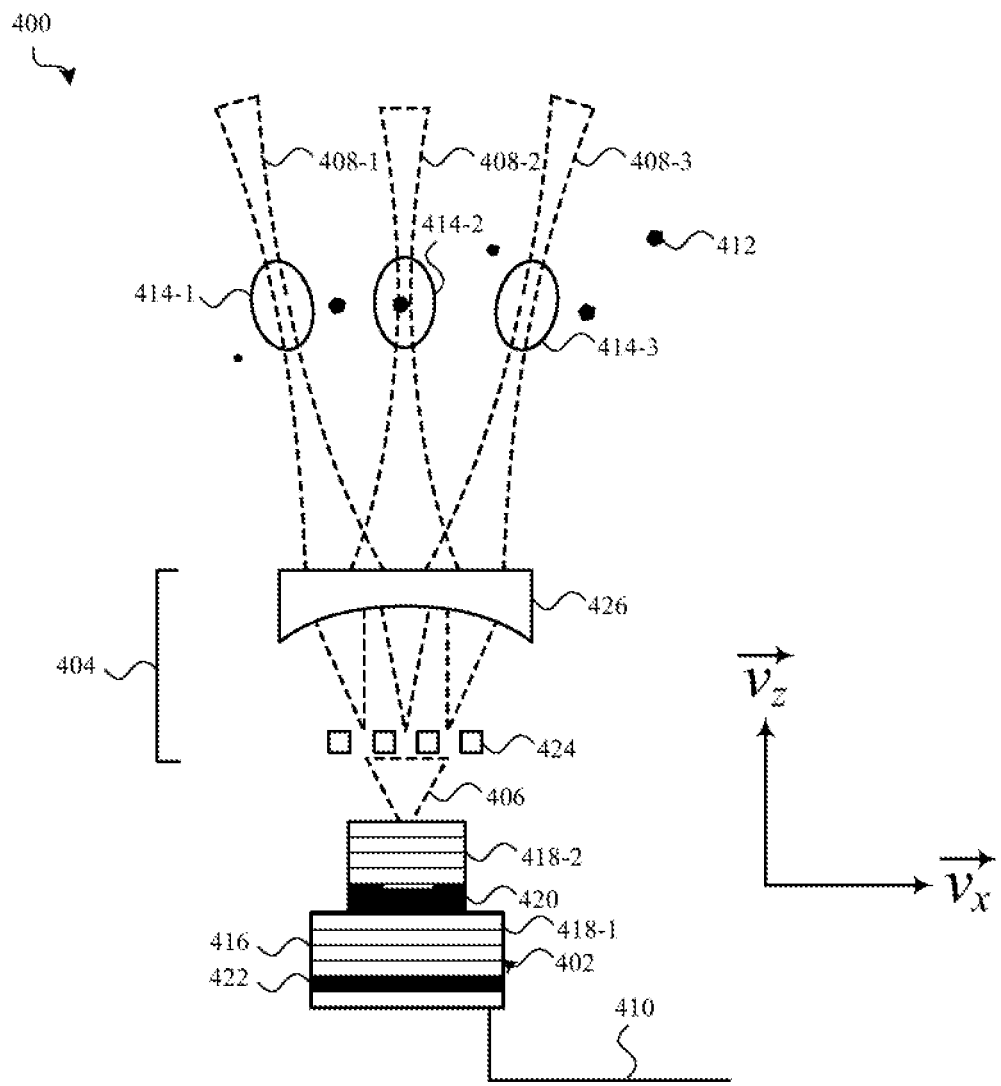
FIG. 4 shows an example elevation of a particulate matter sensor.

FIG. 4 shows an example elevation of a particulate matter sensor 400. The particulate matter sensor 400 is an example of the particulate matter sensor described with reference to FIG. 3, and may include a self-mixing interferometry sensor 402 and set of one or more optical elements 404 (hereafter referred to as a set of optical elements 404). The set of optical elements 404 may be positioned to receive an optical emission 406 of the self-mixing interferometry sensor 402. The set of optical elements 404 may split the optical emission 406 into a set of multiple beams 408-1, 408-2, 408-3 and direct each beam of the multiple beams 408-1, 408-2, 408-3 in a different direction. The self-mixing interferometry sensor 402 may be configured to generate particle speed information 410 for particles 412 passing through respective measurement regions 414-1, 414-2, 414-3 of the multiple beams 408-1, 408-2, 408-3.

The self-mixing interferometry sensor 402 may include an electromagnetic radiation source 416, which in some cases may take the form of any of the electromagnetic radiation sources described with reference to FIG. 3. In some embodiments, the electromagnetic radiation source 416 may include a first (or bottom) mirror 418-1 and a second (or top) mirror 418-2 that are stacked on (e.g., formed on) a semiconductor substrate. The first and second mirrors 418-1, 418-2 may have reflective surfaces that face one another to form (e.g., bound) a resonant optical cavity 420 therebetween. The second mirror 418-2 may be partially transmissive, and may 1) allow a portion of the electromagnetic radiation generated by the electromagnetic radiation source 416 to escape the resonant optical cavity 420 as the optical transmission 406, and 2) allow a portion of the electromagnetic radiation redirected (e.g., reflected or scattered) from a particle 412 passing through one of the measurement regions 414-1, 414-2, 414-3 to re-enter the electromagnetic radiation source 416 and coherently mix with electromagnetic radiation generated by the electromagnetic radiation source 416. In some embodiments, the second (or top) mirror's transmissivity to the wavelength of electromagnetic radiation generated/received by the electromagnetic radiation source 416 may be about 0.5%, although higher or lower transmissivities may be used. The first (or bottom) mirror 418-1 may also be partially transmissive to the wavelength of electromagnetic radiation generated/received by the self-mixing interferometry sensor 402, but in some embodiments may be less transmissive than the second mirror 418-2.

In some cases, the self-mixing interferometry sensor 402 may also include a photodetector 422, which in some cases may be integrated with the electromagnetic radiation source 416. The electromagnetic radiation source 416 may emit the optical emission 406, and an output current of the photodetector 422, or a junction voltage or current of the electromagnetic radiation source 416, may provide the particle speed information 410 (e.g., a self-mixing interference signal containing the particle speed information 410).

In some cases, the self-mixing interferometry sensor 402 may include an electromagnetic radiation source that is stacked on or under a photodetector. In these examples, the first mirror 418-1 may be at least partially transmissive, and electromagnetic radiation passing through the first mirror 418-1 may be detected by the photodetector.

In some embodiments, the set of optical elements 404 may include a diffractive optical element 424 that receives the optical emission 406 and splits it into the multiple beams (e.g., three beams 408-1, 408-2, and 408-3). The diffractive optical element 424 may in some cases be an element having three optical or physical apertures that pass portions of the electromagnetic radiation emitted by the self-mixing interferometry sensor 402. The set of optical elements 404 may also include a set of one or more beam-shaping elements 426 that receives the three beams 408-1, 408-2, 408-3 and focuses each of the beams at one of the respective measurement regions 414-1, 414-2, 414-3. In some embodiments, the set of beam-shaping elements 426 may include a plano-concave lens having its concave surface facing a surface of the diffractive optical element 424. In some embodiments, the set of beam-shaping elements 426 may focus the multiple beams 408-1, 408-2, 408-3 at overlapping or consonant measurement regions 414-1, 414-2, 414-3 (instead of in disjoint measurement regions 414-1, 414-2, 414-3, as shown).

In addition to splitting an optical emission of the self-mixing interferometry sensor 402 into multiple beams, the set of optical elements 404 may receive reflections or backscatters of the multiple beams 408-1, 408-2, 408-3, and direct the received reflections or backscatters into a resonant optical cavity of the self-mixing interferometry sensor's electromagnetic radiation source. The set of optical elements 404 shown in FIG. 4, as a whole, functions as a splitter.

As shown in FIG. 4, particles 412 passing through the measurement regions 414-1, 414-2, 414-3 may have a particle speed including an x-direction particle speed component ($\vec{v}_x$) and a z-direction particle speed component ($\vec{v}_z$). The particles 412 may also have a y-direction particle speed component ($\vec{v}_y$).

Figure 5:
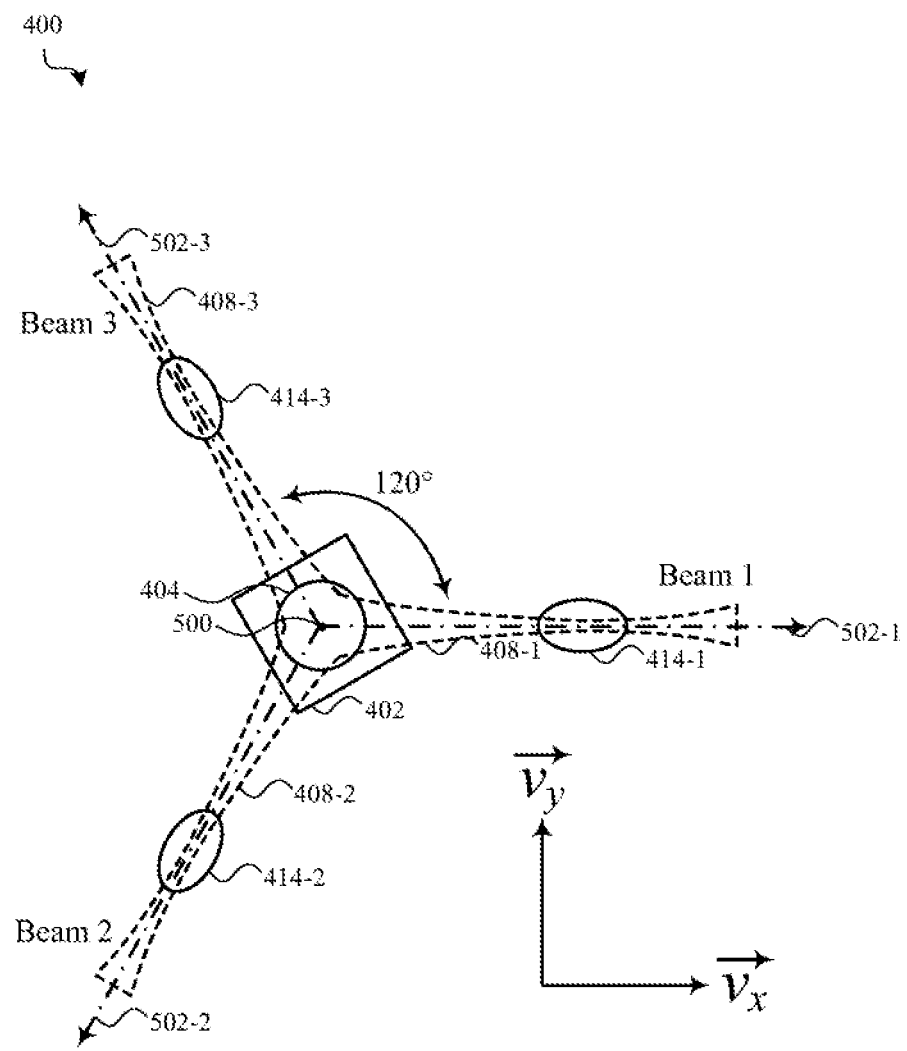
FIG. 5 shows a plan view of the particulate matter sensor.

FIG. 5 shows a plan view of the particulate matter sensor 400. Although the beams 408-1, 408-2, 408-3 may have various relationships to one another, computations made by a processor to estimate particle speed and/or other parameters may be simplified if the beams 408-1, 408-2, 408-3 form an orthogonal basis. The beams 408-1, 408-2, 408-3 may form an orthogonal basis, in some embodiments, when each beam 408-1, 408-2, 408-3 is separated from other beams 408-1, 408-2, 408-3 by 120 degrees (120°), in a plane perpendicular to an axis 500 of the optical emission 406 described with reference to FIG. 4, and when each beam has a secondary axis 502-1, 502-2, or 502-3 that diverges from the axis 500 of the optical emission by an angle, θ, where $\cos^2(\theta) = 1/3$. The angle θ may be configured as part of the optical design of the particulate matter sensor 400.

In FIG. 5 and later figures, the beams 408-1, 408-2, 408-3 are respectively designated Beam 1 408-1, Beam 2 408-2, and Beam 3 408-3.

Figure 6A:
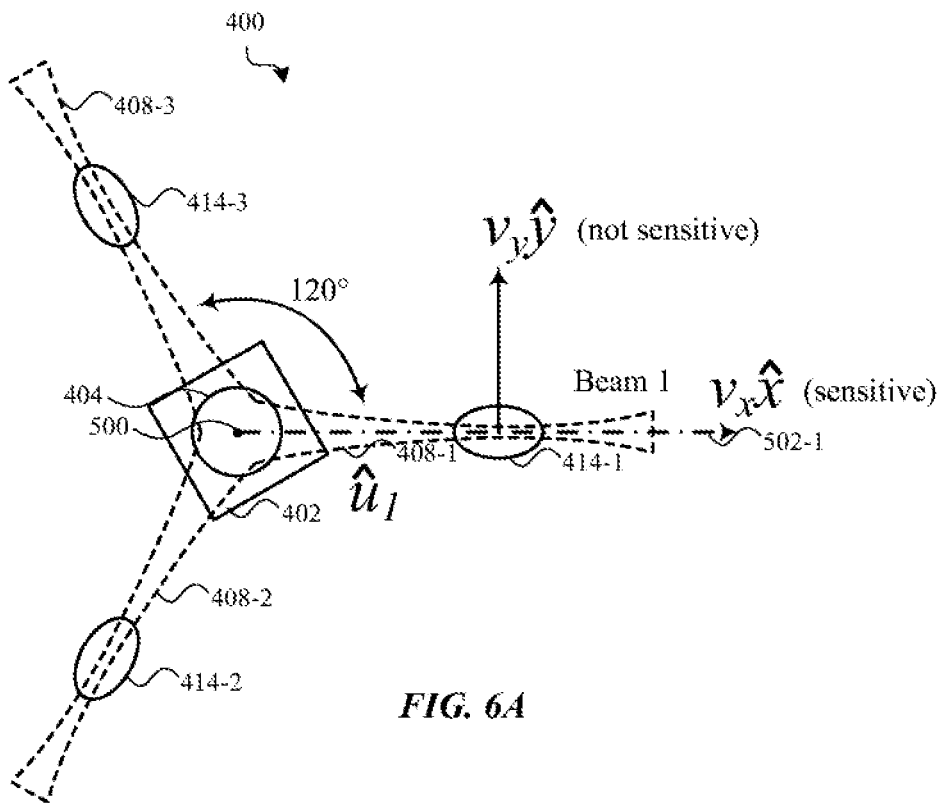
FIGS. 6A-8B show respective plan views ("A" views) and elevations ("B" views) of the beams shown in FIGS. 4 and 5.
Figure 6B:
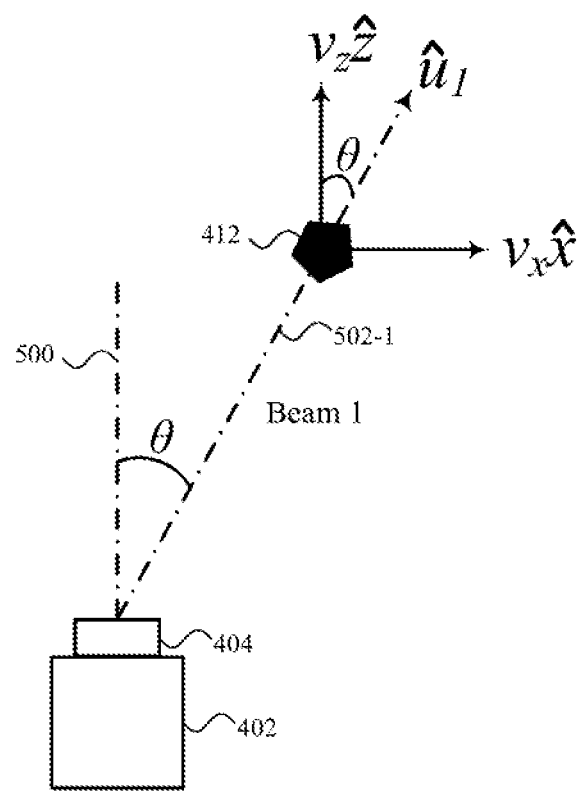

FIGS. 6A-8B show respective plan views and elevations of each of Beam 1, Beam 2, and Beam 3. Turning first to FIGS. 6A and 6B, FIG. 6A shows a plan view of Beam 1 in relation to Beam 2 and Beam 3, and FIG. 6B shows an elevation of Beam 1. In a plane perpendicular to the axis 500 of the optical emission 406, Beam 1 is separated from each of Beam 2 and Beam 3 by 120°. Beam 1 has a secondary axis 502-1 that diverges from the axis 500 of the optical emission by an angle, θ. In some cases, θ may satisfy the condition: $\cos^2(\theta) = 1/3$.

A particle traveling through the measurement region 414-1 may have a particle speed vector: $\vec{v}_p = v_x \hat{x} + v_y \hat{y} + v_z \hat{z}$, where $\hat{x}$, $\hat{y}$, and $\hat{z}$ are unit vectors in orthogonal x, y, and z directions. However, the self-mixing interferometry sensor 402 may only measure a component of the particle's speed, which component is in the direction of a unit vector, $\hat{u}_1$. The unit vector $\hat{u}_1$ shares an axis with Beam 1, and may be defined with respect to an x/y/z orthogonal basis as:

$$\hat{u}_1 = \sin(\theta)\hat{x} + \cos(\theta)\hat{z}$$

When a particle passes through the measurement region 414-1, the particle may generate a self-mixing interference signal (at the self-mixing interferometry sensor 402) oscillating at the frequency of the Doppler frequency shift induced by the particle on the reflected or back-scattered electromagnetic radiation. The Doppler frequency shift may be associated with a Doppler frequency, $f_1$, which Doppler frequency may be proportionate to the particle's speed in the direction of Beam 1 and defined as follows:

$$f_1 = \frac{2}{\lambda}\vec{v}_p \cdot \hat{u}_1 = \frac{2}{\lambda}(v_x \sin(\theta) + v_z \cos(\theta)) \rightarrow v_x \sin(\theta) + v_z \cos(\theta) = \frac{f_1 \lambda}{2}$$

Figure 7A:
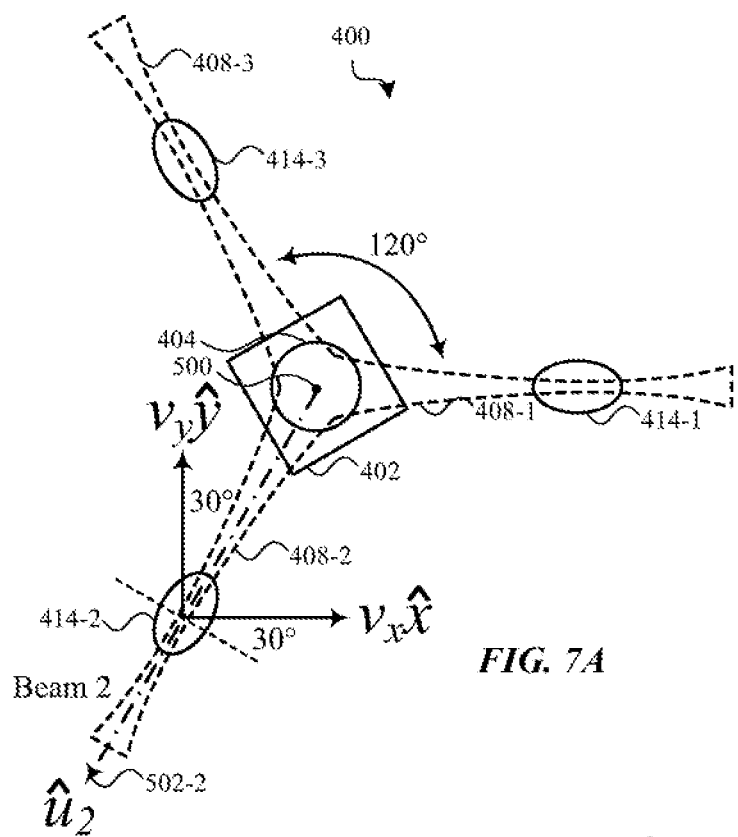
Figure 7B:
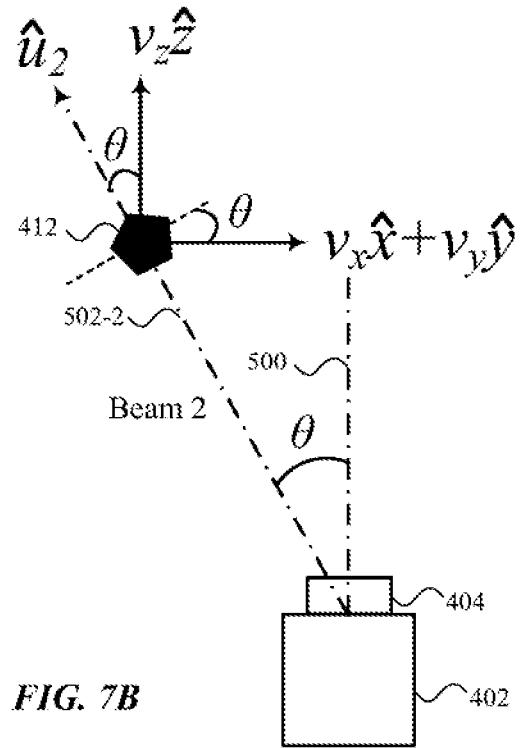

FIG. 7A shows a plan view of Beam 2 in relation to Beam 1 and Beam 3, and FIG. 7B shows an elevation of Beam 2. In a plane perpendicular to the axis 500 of the optical emission 406 described with reference to FIG. 4, Beam 2 is separated from each of Beam 1 and Beam 3 by 120°. Beam 2 has a secondary axis 502-2 that diverges from the axis 500 of the optical emission by an angle, θ. In some cases, θ may satisfy the condition: $\cos^2(\theta) = 1/3$.

A particle traveling through the measurement region 414-2 may also have the particle speed vector: $\vec{v}_p = v_x \hat{x} + v_y \hat{y} + v_z \hat{z}$, but the self-mixing interferometry sensor 402 may only measure a component of the particle's speed, which component is in the direction of a unit vector, $\hat{u}_2$. The unit vector $\hat{u}_2$ shares an axis with Beam 2, and may be defined with respect to an x/y/z orthogonal basis as:

$$\hat{u}_2 = \frac{-\sin(\theta)}{2}\hat{x} - \frac{\sqrt{3}\,\sin(\theta)}{2}\hat{y} + \cos(\theta)\hat{z}$$

When a particle passes through the measurement region 414-2, the particle may generate a self-mixing interference signal (at the self-mixing interferometry sensor 402) oscillating at the frequency of the Doppler frequency shift induced by the particle on the reflected or back-scattered electromagnetic radiation. The Doppler frequency shift may be associated with a Doppler frequency, $f_2$, which Doppler frequency may be proportionate to the particle's speed in the direction of Beam 2 and defined as follows:

$$f_2 = \frac{2}{\lambda}\vec{v_p}\cdot\hat{u}_2 = \frac{2}{\lambda}\left(\frac{-v_x\sin(\theta)}{2} - \frac{\sqrt{3}\,v_y\sin(\theta)}{2} + v_z\cos(\theta)\right) \rightarrow$$

$$v_x\sin(\theta) + \sqrt{3}\,v_y\sin(\theta) - 2v_z\cos(\theta) = -f_2\lambda$$

Figure 8A:
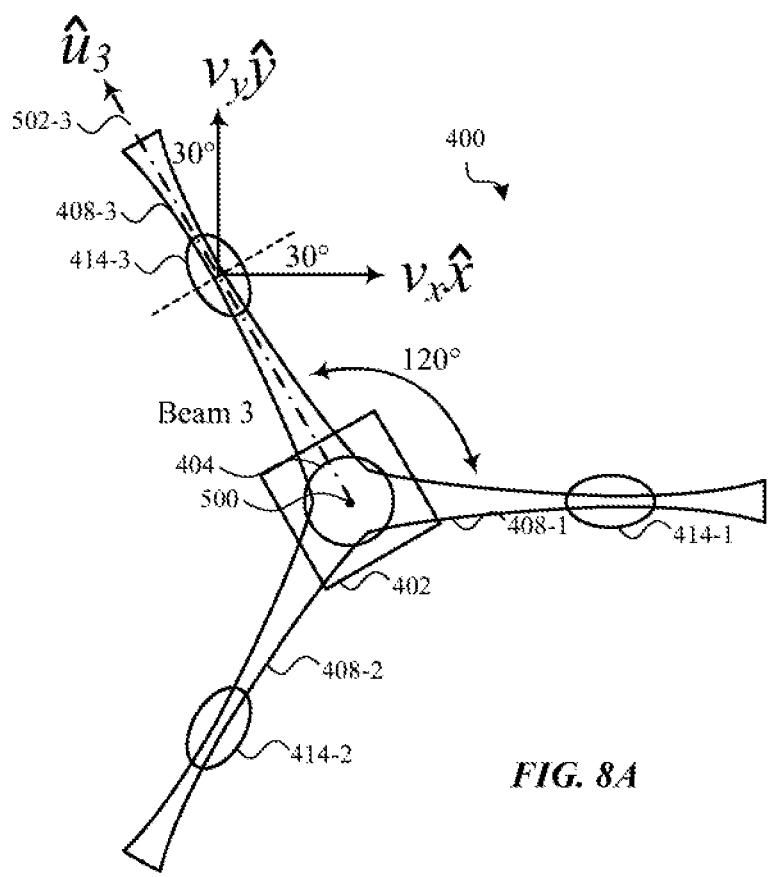
Figure 8B:
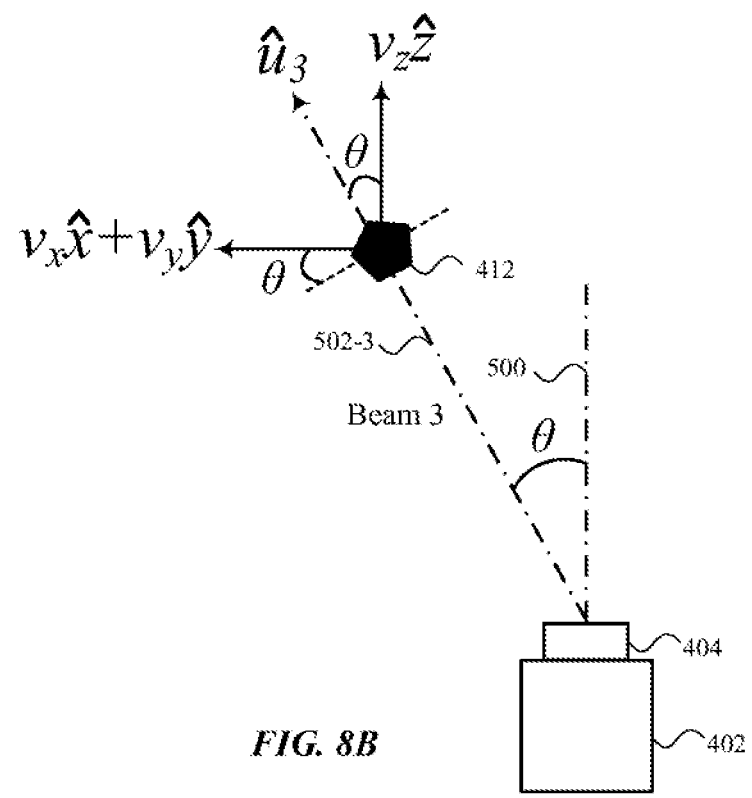

FIG. 8A shows a plan view of Beam 3 in relation to Beam 1 and Beam 2, and FIG. 8B shows an elevation of Beam 3. In a plane perpendicular to the axis 500 of the optical emission 406 described with reference to FIG. 4, Beam 3 is separated from each of Beam 1 and Beam 2 by 120°. Beam 3 has a secondary axis 502-3 that diverges from the axis 500 of the optical emission by an angle, θ. In some cases, θ may satisfy the condition: $\cos^2(\theta)=\frac{1}{3}$.

A particle traveling through the measurement region 414-3 may have a particle speed vector: $\vec{v_p}=v_x\hat{x}+v_y\hat{y}+v_z\hat{z}$, where $\hat{x}$, $\hat{y}$, and $\hat{z}$ are unit vectors in orthogonal x, y, and z directions. However, the self-mixing interferometry sensor 402 may only measure a component of the particle's speed, which component is in the direction of a unit vector, $\hat{u}_3$. The unit vector $\hat{u}_3$ shares an axis with Beam 3, and may be defined with respect to an x/y/z orthogonal basis as:

$$\hat{u}_3 = \frac{-\sin(\theta)}{2}\hat{x} + \frac{\sqrt{3}\,\sin(\theta)}{2}\hat{y} + \cos(\theta)\hat{z}$$

When a particle passes through the measurement region 414-3, the particle may generate a self-mixing interference signal (at the self-mixing interferometry sensor 402) oscillating at the frequency of the Doppler frequency shift induced by the particle on the reflected or backscattered electromagnetic radiation. The Doppler frequency shift may be associated with a Doppler frequency, $f_3$, which Doppler frequency may be proportionate to the particle's speed in the direction of Beam 3 and defined as follows:

$$f_3 = \frac{2}{\lambda}\vec{v_p}\cdot\hat{u}_3 = \frac{2}{\lambda}\left(\frac{-v_x\sin(\theta)}{2} + \frac{\sqrt{3}\,v_y\sin(\theta)}{2} + v_z\cos(\theta)\right) \rightarrow$$

$$v_x\sin(\theta) - \sqrt{3}\,v_y\sin(\theta) - 2v_z\cos(\theta) = -f_3\lambda$$

Different particles may pass through the different measurement regions 414-1, 414-2, 414-3 described with reference to FIGS. 4-8B. However, the self-mixing interference signal provided by the self-mixing interferometry sensor 402 may include particle speed information for particles passing through each of the measurement regions 414-1, 414-2, 414-3. In most cases, particles will pass through the different measurement regions 414-1, 414-2, 414-3 at different times, and thus the particle speed information for different particles will be distinguishable in time (even though the particular beam and measurement region through which a particle passed to generate the particle speed information may not be identifiable). The particle speed information may take the form of unsigned Doppler frequency shifts (e.g., If $|f_1|$, $|f_2|$, and $|f_3|$) included in the self-mixing interference signal. Thus, only particle speed information (i.e., particle speed magnitude), and not particle speed information (i.e., a speed and direction of motion), may be extracted from the self-mixing interference signal.

As discussed with reference to FIGS. 6A-8B, the particle velocities ($v_x$, $v_y$, and $v_z$) of particles 412 passing through the measurement regions 414-1, 414-2, and 414-3 are related to the angle θ, the wavelength, λ, of the optical emission 406, and the Doppler frequencies $f_1$, $f_2$, and $f_3$ as follows:

$$v_x\sin(\theta)+v_z\cos(\theta)=f_1\lambda/2$$

$$v_x\sin(\theta)+\sqrt{3}v_y\sin(\theta)-2v_z\cos(\theta)=-f_2\lambda$$

$$v_x\sin(\theta)-\sqrt{3}v_y\sin(\theta)-2v_z\cos(\theta)=-f_3\lambda$$

Solving the above equations for the particle velocities $v_x$, $v_y$, and $v_z$ yields the equations:

$$v_x = \frac{\lambda}{6\sin(\theta)}(2f_1 - f_2 - f_3)$$

$$v_y = \frac{\lambda}{2\sqrt{3}\,\sin(\theta)}(f_3 - f_2)$$

$$v_z = \frac{\lambda}{6\cos(\theta)}(f_1 + f_2 + f_3)$$

Substituting the above equations into the particle speed equation $$|\vec{v_p}| = \sqrt{v_x^2 + v_y^2 + v_z^2} \text{ yields:}$$

$$|\vec{v_p}| = \frac{\lambda}{6|\cos(\theta)\sin(\theta)|}$$

$$\sqrt{(1+3\cos^2\theta)(f_1^2+f_2^2+f_3^2)+(2-6\cos^2\theta)(f_1f_2+f_1f_3+f_2f_3)}$$

If θ is selected such that $\cos^2(\theta)=\frac{1}{3}$, the above equation simplifies to:

$$|\vec{v_p}| = \frac{\lambda}{6|\cos(\theta)\sin(\theta)|}\sqrt{2(f_1^2+f_2^2+f_3^2)}$$

and the particle speed, $|\vec{v_p}|$, can be estimated using the unsigned Doppler frequency shifts $|f_1|$, $|f_2|$, and $|f_3|$, without knowing the signs of the Doppler frequency shifts, and without knowing which Doppler frequency shift is experienced by which of the multiple beams 408-1, 408-2, 408-3 (i.e., $|f_1|$, $|f_2|$, and $|f_3|$ are interchangeable in the above equation, as are $f_1$, $f_2$, and $f_3$).

The particle speed $|\vec{v_p}|$ may be estimated even when $\cos^2(\theta)\neq\frac{1}{3}$, but the accuracy of the estimation improves (and error decreases) as $\cos^2(\theta)$ approaches $\frac{1}{3}$. When $\cos^2(\theta)\neq\frac{1}{3}$, particle speed may still be estimated with sufficient accuracy by placing limits on particle flow direction.

Figure 9:
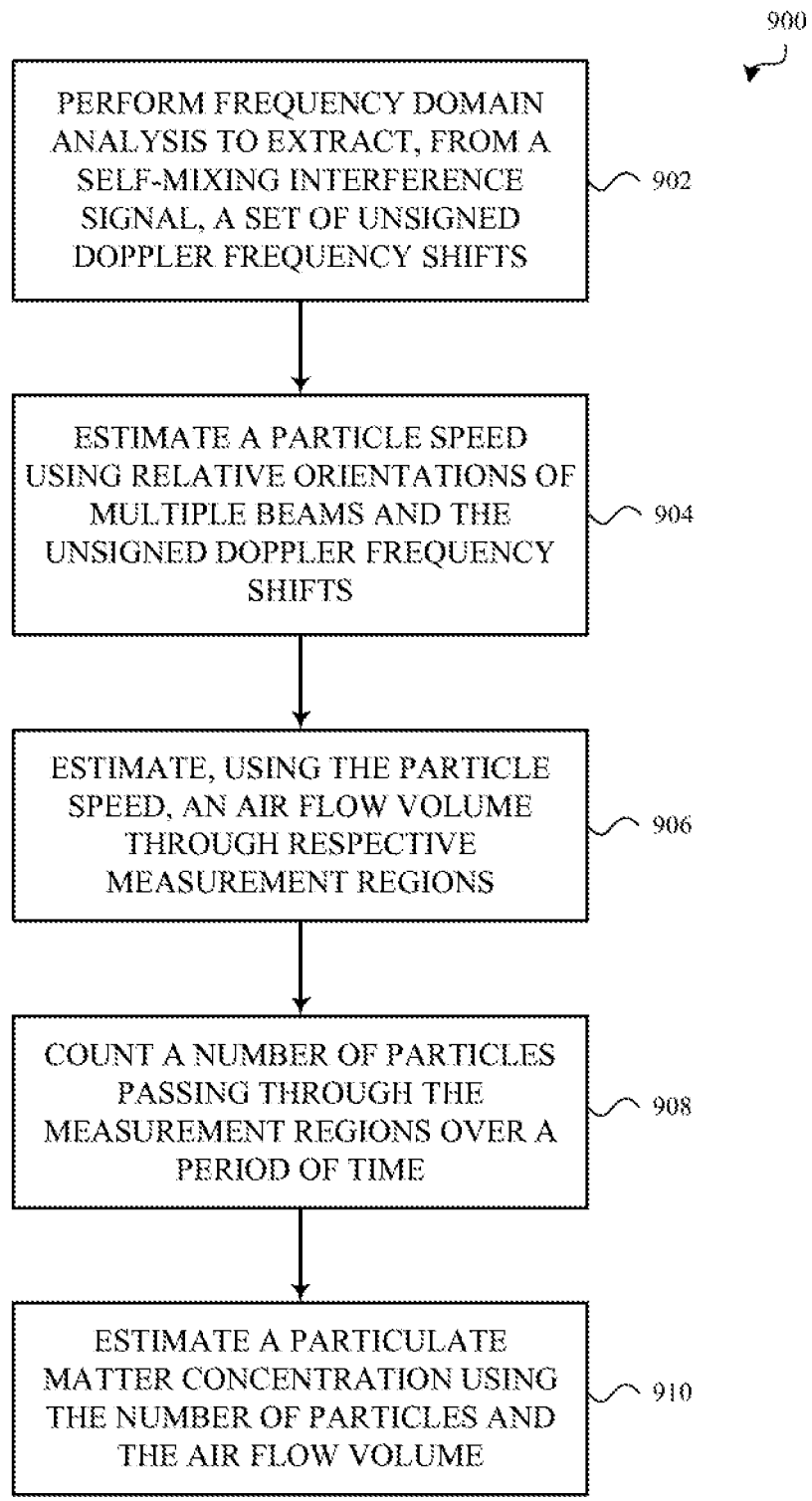
FIG. 9 shows an example method of estimating particulate matter concentration, which method may be performed by circuitry associated with a self-mixing interferometry sensor.

FIG. 9 shows an example method 900 of estimating particulate matter concentration, which method 900 may be performed by circuitry (e.g., an ASIC or processor) associated with a self-mixing interferometry sensor. The circuitry may receive, as input, digitized samples of a self-mixing interference signal generated by the self-mixing interferometry sensor, or in some cases may receive, sample, and digitize the self-mixing interference signal. The self-mixing interferometry sensor may, in some embodiments, include any of the self-mixing interferometry sensors described with reference to FIGS. 3-8B. Alternatively, the self-mixing interferometry sensor may be another type of self-mixing interferometry sensor.

At block 902, the method 900 may include performing a frequency domain analysis (e.g., a fast Fourier transform (FFT)) or a time-frequency domain analysis (e.g., a continuous wavelet transform) to extract, from the self-mixing interference signal, a set of unsigned Doppler frequency shifts (e.g., $|f_1|$, $|f_2|$, and $|f_3|$).

At block 904, the method 900 may include estimating a particle speed using relative orientations of the multiple beams and the unsigned Doppler frequency shifts. Of note, the estimated particle speed is actually the speed of a hypothetical particle, which hypothetical particle is assumed to behave similarly to the particles passing through different measurement regions associated with respective different beams split from an optical emission of the self-mixing interferometry sensor.

At block 906, the method 900 may include estimating, using the particle speed, an air flow volume through the measurement regions (e.g., how much air passed through a collective volume of the three measurement regions within a given time (e.g., 100 microliter (μL) of air in one second (s))).

At block 908, the method 900 may include counting a number of particles passing through the measurement regions over a period of time (e.g., 30 particles in one second). Particles may be counted by counting the number of time-domain disturbances (or Doppler frequency shifts) in the self-mixing interference signal over a period of time.

At block 910, the method 900 may include estimating a particulate matter concentration (e.g., a particulate matter concentration in air) using the number of particles counted at block 908 and the air flow volume estimated at block 906. In some embodiments, the circuitry may assume a fixed particle size and fixed mass density to convert from a number of particles within a volume to a particle mass or particle density within a volume.

In some cases, the circuitry that performs the method 900, or other circuitry, may be configured to detect an existence of particulate matter (instead of, or in addition to, a particulate matter concentration). In some cases, the existence (or non-existence) of particulate matter may be detected using particle speed information (e.g., the Doppler frequency shifts) extracted from the self-mixing interference signal.

Figure 10:
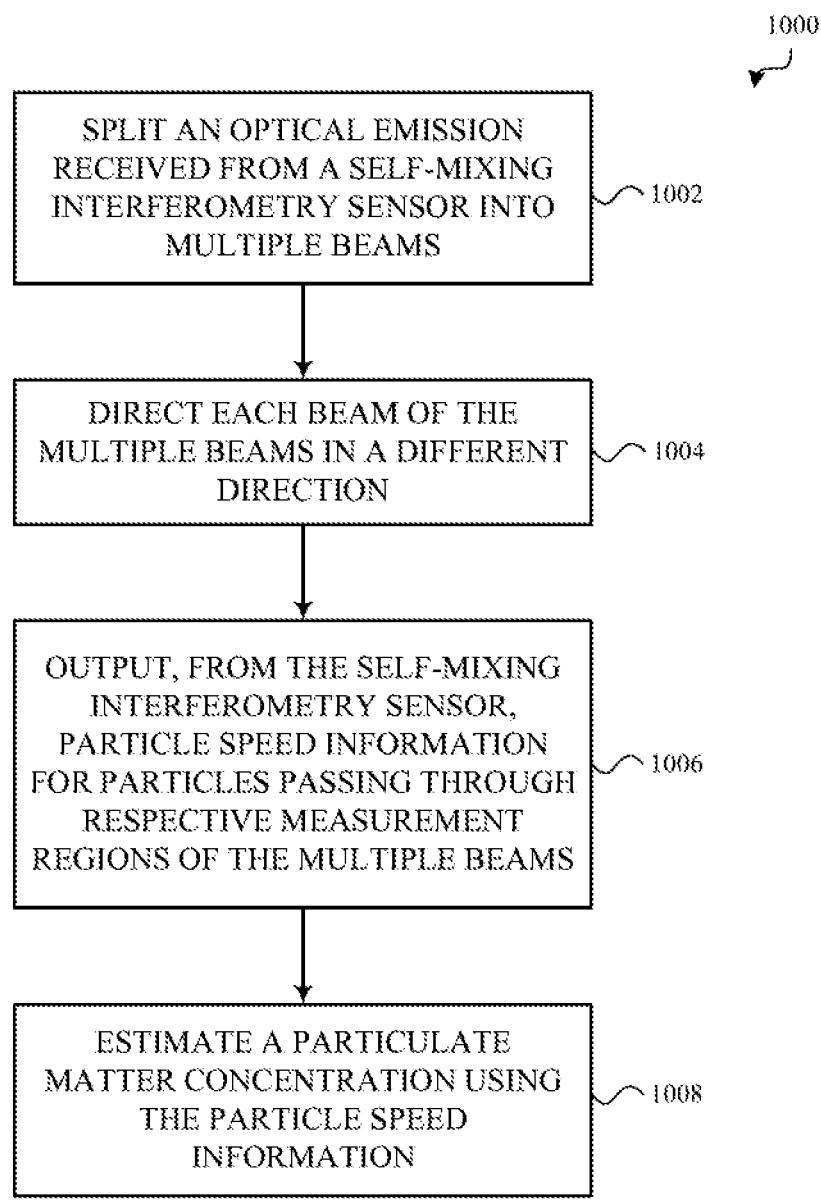
FIG. 10 shows an example method of sensing particulate matter.

FIG. 10 shows an example method 1000 of sensing particulate matter. The method 1000 may be performed by a self-mixing interferometry sensor and circuitry (e.g., an ASIC or processor) associated with the self-mixing interferometry sensor. The self-mixing interferometry sensor may provide, as an input to the circuitry, digitized samples of a self-mixing interference signal generated by the self-mixing interferometry sensor. Alternatively, the circuitry may receive the self-mixing interference signal, and sample and digitize the self-mixing interference signal. The self-mixing interferometry sensor may, in some embodiments, include any of the self-mixing interferometry sensors described with reference to FIGS. 3-8B. Alternatively, the self-mixing interferometry sensor may be another type of self-mixing interferometry sensor. The circuitry may in some cases be or include some or all of the circuitry that performs the method 900 described with reference to FIG. 9.

At block 1002, the method 1000 may include splitting an optical emission received from a self-mixing interferometry sensor into multiple beams. In some embodiments, the operation(s) at block 1002 may be performed by the set of optical elements described with reference to any of FIGS. 3-8B.

At block 1004, the method 1000 may include directing each beam of the multiple beams in a different direction. Optionally, the operation(s) at block 1004 may include focusing each beam of the multiple beams at one of the respective measurement regions. In some embodiments, the operation(s) at block 1004 may be performed by the set of optical elements described with reference to any of FIGS. 3-8B.

At block 1006, the method 1000 may include outputting, from the self-mixing interferometry sensor, particle speed information for particles passing through the multiple beams (e.g., through respective measurement regions of the multiple beams). In some embodiments, the particle speed information may include a set of unsigned Doppler frequency shifts (e.g., $|f_1|$, $|f_2|$, and $|f_3|$) contained in a self-mixing interference signal.

At block 1008, the method 1000 may optionally include estimating a particulate matter concentration using the particle speed information. The estimate may be made by the circuitry associated the self-mixing interferometry sensor.

Optionally, the method 1000 may include the operations of the method 900 described with reference to FIG. 9.

Figure 11:
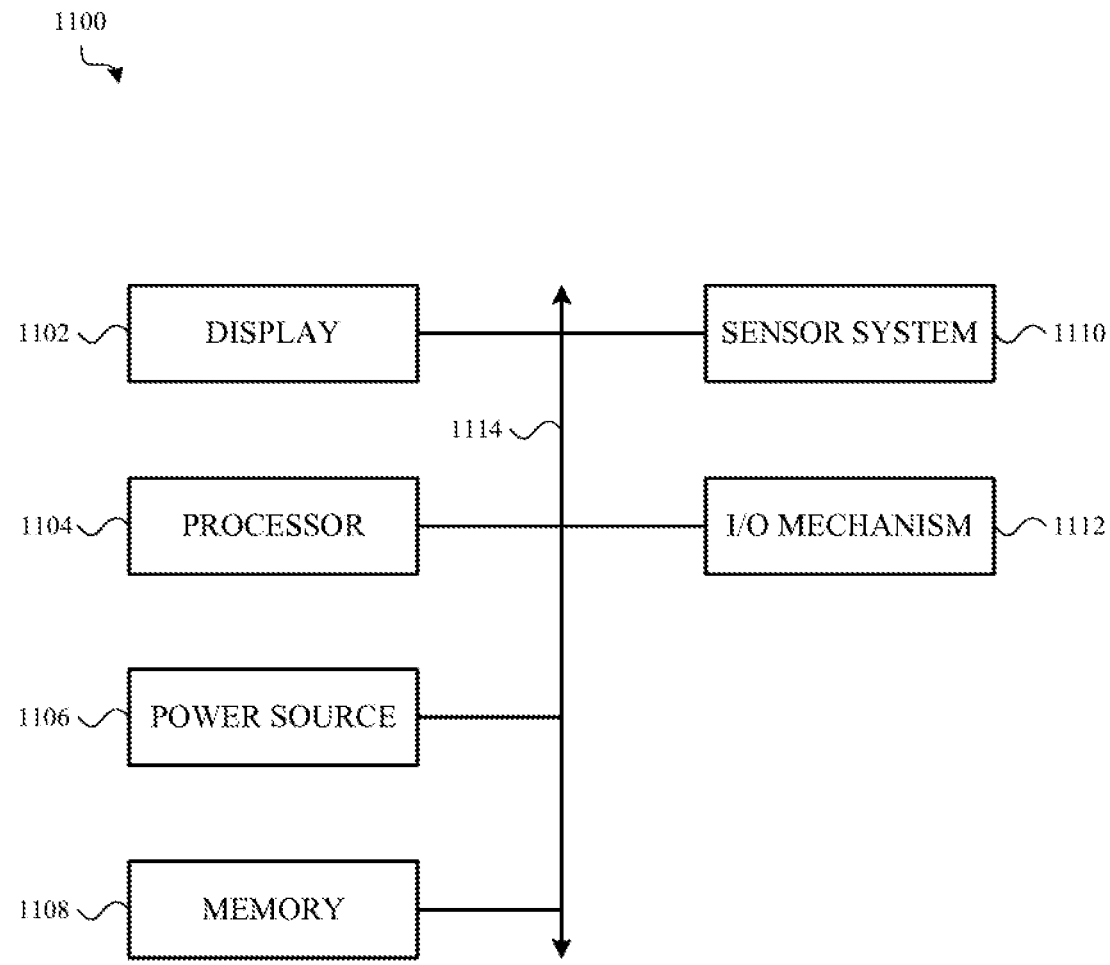
FIG. 11 shows an example electrical block diagram of an electronic device.

FIG. 11 shows a sample electrical block diagram of an electronic device 1100, which electronic device may in some cases take the form of the device described with reference to FIGS. 1A-1B or FIGS. 2A-2B and/or include a particulate matter sensor as described with reference to any of FIGS. 3-8B. The electronic device 1100 may include a display 1102 (e.g., a light-emitting display), a processor 1104, a power source 1106, a memory 1108 or storage device, a sensor system 1110, or an input/output (I/O) mechanism 1112 (e.g., an input/output device, input/output port, or haptic input/output interface). The processor 1104 may control some or all of the operations of the electronic device 1100. The processor 1104 may communicate, either directly or indirectly, with some or all of the other components of the electronic device 1100. For example, a system bus or other communication mechanism 1114 can provide communication between the display 1102, the processor 1104, the power source 1106, the memory 1108, the sensor system 1110, and the I/O mechanism 1112.

The processor 1104 may be implemented as any electronic device capable of processing, receiving, or transmitting data or instructions, whether such data or instructions is in the form of software or firmware or otherwise encoded. For example, the processor 1104 may include a microprocessor, a central processing unit (CPU), an application-specific integrated circuit (ASIC), a digital signal processor (DSP), a controller, or a combination of such devices. As described herein, the term "processor" is meant to encompass a single processor or processing unit, multiple processors, multiple processing units, or other suitably configured computing element or elements.

It should be noted that the components of the electronic device 1100 can be controlled by multiple processors. For example, select components of the electronic device 1100 (e.g., the sensor system 1110) may be controlled by a first processor and other components of the electronic device 1100 (e.g., the display 1102) may be controlled by a second processor, where the first and second processors may or may not be in communication with each other.

The power source 1106 can be implemented with any device capable of providing energy to the electronic device 1100. For example, the power source 1106 may include one or more batteries or rechargeable batteries. Additionally or alternatively, the power source 1106 may include a power connector or power cord that connects the electronic device 1100 to another power source, such as a wall outlet.

The memory 1108 may store electronic data that can be used by the electronic device 1100. For example, the memory 1108 may store electrical data or content such as, for example, audio and video files, documents and applications, device settings and user preferences, timing signals, control signals, and data structures or databases. The memory 1108 may include any type of memory. By way of example only, the memory 1108 may include random access memory, read-only memory, Flash memory, removable memory, other types of storage elements, or combinations of such memory types.

The electronic device 1100 may also include one or more sensor systems 1110 positioned almost anywhere on the electronic device 1100. In some cases, sensor systems 1110 may be positioned as described with reference to FIGS. 1A-1B, or FIGS. 2A-2B. The sensor system(s) 1110 may be configured to sense one or more type of parameters, such as but not limited to, light; touch; force; heat; movement; relative motion; biometric data (e.g., biological parameters) of a user; particulate matter concentration; air quality; proximity; position; connectedness; and so on. By way of example, the sensor system(s) 1110 may include a heat sensor, a position sensor, a light or optical sensor, an accelerometer, a pressure transducer, a gyroscope, a magnetometer, a health monitoring sensor, a particulate matter sensor, an air quality sensor, and so on. Additionally, the one or more sensor systems 1110 may utilize any suitable sensing technology, including, but not limited to, magnetic, capacitive, ultrasonic, resistive, optical, acoustic, piezoelectric, or thermal technologies.

The I/O mechanism 1112 may transmit or receive data from a user or another electronic device. The I/O mechanism 1112 may include the display 1102, a touch sensing input surface, a crown, one or more buttons (e.g., a graphical user interface "home" button), one or more cameras (including an under-display camera), one or more microphones or speakers, one or more ports such as a microphone port, and/or a keyboard. Additionally or alternatively, the I/O mechanism 1112 may transmit electronic signals via a communications interface, such as a wireless, wired, and/or optical communications interface. Examples of wireless and wired communications interfaces include, but are not limited to, cellular and Wi-Fi communications interfaces.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

What is claimed is:

1. A particulate matter sensor, comprising:
   a self-mixing interferometry sensor configured to generate a self-mixing interference signal;
   a set of one or more optical elements positioned to receive an optical emission of the self-mixing interferometry sensor, split the optical emission into multiple beams, direct each beam of the multiple beams in a different direction towards a respective measurement region, and redirect received reflections or backscatters of the multiple beams from the respective measurement regions back into the self-mixing interferometry sensor to generate the self-mixing interference signal, wherein each of the multiple beams is separated from other beams of the multiple beams by 120 degrees in a plane perpendicular to an axis of the optical emission and each of the multiple beams has a secondary axis that diverges from the axis of the optical emission by a same angle $\theta$; and
   circuitry configured to:
   extract, from the self-mixing interference signal, particle speed information for particles passing through any of the multiple beams;
   estimate a particle speed using the angle $\theta$ and using the particle speed information for particles passing through any of the multiple beams interchangeably;
   estimate, using the particle speed, an air flow volume through respective measurement regions of the multiple beams;
   count a number of time-domain disturbances in the self-mixing interference signal over a period of time, the number of time-domain disturbances corresponding to the number of particles passing through the respective measurement regions over the period of time; and
   estimate a particulate matter concentration using the number of particles, and the air flow volume.

2. The particulate matter sensor of claim 1, wherein the particle speed information comprises Doppler frequency shifts.

3. The particulate matter sensor of claim 2, wherein the circuitry is further configured to:
   perform a frequency domain analysis to extract the Doppler frequency shifts from the self-mixing interference signal.

4. The particulate matter sensor of claim 2, wherein the circuitry is further configured to:
   perform a time-frequency domain analysis to extract the Doppler frequency shifts from the self-mixing interference signal.

5. The particulate matter sensor of claim 2, wherein the Doppler frequency shifts comprise unsigned Doppler frequency shifts.

6. The particulate matter sensor of claim 1, wherein the angle $\theta$ is selected such that $\cos^2(\theta)=\frac{1}{3}$.

7. The particulate matter sensor of claim 1, wherein the circuitry is further configured to detect an existence of particulate matter using the particle speed.

8. The particulate matter sensor of claim 1, wherein the multiple beams consist of three beams.

9. The particulate matter sensor of claim 1, wherein the self-mixing interferometry sensor comprises an electromagnetic radiation source integrated with a photodetector.

10. The particulate matter sensor of claim 1, wherein:

the self-mixing interferometry sensor comprises an electromagnetic radiation source and a photodetector;

the electromagnetic radiation source has a resonant optical cavity bounded by first and second mirrors, with each of the first mirror and the second mirror being at least partially transmissive to a wavelength of electromagnetic radiation; and the electromagnetic radiation source is stacked on the photodetector.

11. The particulate matter sensor of claim 1, wherein:

the set of one or more optical elements is a first set of one or more optical elements; and the particulate matter sensor further comprises a second set of one or more optical elements configured to receive the set of multiple beams and redirect the set of multiple beams toward a set of overlapping or consonant measurement regions.

12. A method of sensing particulate matter, comprising:

splitting an optical emission received from a self-mixing interferometry sensor into multiple beams;

directing each beam of the multiple beams in a different direction towards a respective measurement region, wherein each of the multiple beams is separated from other beams of the multiple beams by 120 degrees in a plane perpendicular to an axis of the optical emission and each of the multiple beams has a secondary axis that diverges from the axis of the optical emission by a same angle $\theta$;

redirecting received reflections or backscatters of the multiple beams from the respective measurement regions back into the self-mixing interferometry sensor to generate the self-mixing interferometry signal;

extracting, from the self-mixing interference signal, particle speed information for particles passing through any of the multiple beams;

estimating a particle speed using the angle $\theta$, and the particle speed information for particles passing through any of the multiple beams interchangeably;

estimating, using the particle speed, an air flow volume through respective measurement regions of the multiple beams;

counting a number of time-domain disturbances in the self-mixing interference signal over a period of time, the number of time-domain disturbances corresponding to the number of particles passing through the respective measurement regions over a period of time; and estimating a particulate matter concentration using the number of particles, and the air flow volume.

13. The method of claim 12, wherein the particle speed information comprises Doppler frequency shifts, and the method further comprises:

performing a frequency domain analysis to extract the Doppler frequency shifts from the self-mixing interference signal.

14. The method of claim 12, wherein: the angle $\theta$ is selected such that $\cos^2(\theta)=\frac{1}{3}$.

15. The method of claim 12, wherein the particle speed information comprises Doppler frequency shifts, and the method further comprises:

performing a time-frequency domain analysis to extract the Doppler frequency shifts from the self-mixing interference signal.

16. The method of claim 15, wherein the Doppler frequency shifts comprise unsigned Doppler frequency shifts.

17. The method of claim 12, further comprising:

receive the set of multiple beams and redirect the set of multiple beams toward a set of overlapping or consonant measurement regions.

\* \* \* \* \*